(12) United States Patent
Hars (10) Patent No.: US 9,946,662 B2
(45) Date of Patent: Apr. 17, 2018

(54) DOUBLE-MIX FEISTEL NETWORK FOR KEY GENERATION OR ENCRYPTION

(71) Applicant: The Boeing Company, Huntington Beach, CA (US)

(72) Inventor: Laszlo Hars, Lafayette, CO (US)

(73) Assignee: THE BOEING COMPANY, Chicago, IL (US)

( * ) Notice: Subject to any disclaimer, the term of this patent is extended or adjusted under 35 U.S.C. 154(b) by 336 days.

(21) Appl. No.: 14/472,978

(22) Filed: Aug. 29, 2014

(65) Prior Publication Data

US 2016/0062919 A1   Mar. 3, 2016

(51) Int. Cl.
  *G06F 12/14*   (2006.01)
  *G06F 21/85*   (2013.01)

(52) U.S. Cl.
  CPC .......... *G06F 12/1408* (2013.01); *G06F 21/85* (2013.01)

(58) Field of Classification Search
  CPC .......................... H04L 9/0631; H04L 9/0625
  See application file for complete search history.

(56) References Cited

U.S. PATENT DOCUMENTS

| | | | |
|---|---|---|---|
| 6,122,375 A * | 9/2000 | Takaragi | H04L 9/0643 380/28 |
| 7,093,137 B1 | 8/2006 | Sato et al. | |
| 7,469,344 B2 | 12/2008 | Folmsbee | |
| 7,802,108 B1 | 9/2010 | Master et al. | |
| 7,894,599 B2 | 2/2011 | Rigler | |
| 7,937,595 B1 | 5/2011 | Kumar et al. | |
| 8,370,645 B2 | 2/2013 | Asnaashari | |
| 8,504,849 B2 | 8/2013 | Jogand-Coulomb et al. | |
| 9,252,943 B1 | 2/2016 | Hars | |
| 2001/0038693 A1* | 11/2001 | Luyster | H04L 9/002 380/37 |
| 2004/0091107 A1* | 5/2004 | Fujisaki | H04L 9/003 380/42 |
| 2010/0115286 A1* | 5/2010 | Hawkes | G06F 12/1408 713/189 |

(Continued)

OTHER PUBLICATIONS

Matsui, Mitsuru. "New block encryption algorithm MISTY." Fast Software Encryption. Springer Berlin Heidelberg, 1997.*

(Continued)

*Primary Examiner* — Mahfuzur Rahman
*Assistant Examiner* — Michael Guirguis
(74) *Attorney, Agent, or Firm* — Womble Bond Dickinson (US) LLP (57) ABSTRACT

A method of providing security in a computer system includes dividing a block of data into initial left and right halves, and calculating updated left and right halves for each of a plurality of rounds. Calculating the updated left half includes applying a first function to an input left half to produce a first result, and mixing the first result with an input right half. Calculating the updated right half includes applying a second function to the input left half to produce a second result, and mixing the second result with a round key. The input left and right halves are the initial left and right halves for the first round, and thereafter the updated left and right halves for an immediately preceding round. And method may include producing a block of ciphertext with a key composed of the updated left and right halves for the last round.

20 Claims, 5 Drawing Sheets

(56) References Cited

U.S. PATENT DOCUMENTS

| | | | | |
|---|---|---|---|---|
| 2010/0299538 A1* | 11/2010 | Miller | ............... | G06F 12/1408 |
| | | | | 713/190 |
| 2011/0110519 A1* | 5/2011 | Suzaki | ............... | H04L 9/0625 |
| | | | | 380/255 |
| 2012/0170738 A1* | 7/2012 | Lablans | ............ | H03M 13/158 |
| | | | | 380/28 |
| 2013/0117577 A1* | 5/2013 | Hars | ............... | G06F 12/1408 |
| | | | | 713/190 |
| 2013/0308775 A1* | 11/2013 | Minematsu | ......... | H04L 9/0625 |
| | | | | 380/28 |

OTHER PUBLICATIONS

Al-Hazaimeh, "Design of a New Block Cipher Algorithm," IISTE, Network and Complex Systems, vol. 3, No. 8, 2013, 7 pages.

Beaulieu et al., "The Simon and Speck Families of Lightweight Block Ciphers," NSA, Jun. 2013, 45 pages.

Bogdanov et al., "PRESENT: An Ultra-Lightweight Block Cipher," Cryptographic Hardware and Embedded Systems—CHES 2007, Lecture Notes in Computer Science, vol. 4727, 2007, pp. 450-466.

Hars et al., "Pseudorandom recursions II," EURASIP Journal on Embedded Systems, 2012, 11 pages.

Knudsen et al., "PRINTcipher: A Block Cipher for IC-Printing," Cryptographic Hardware and Embedded Systems, CHES 2010, Lecture Notes in Computer Science, vol. 6225, Aug. 2010, 15 pages.

"Feistel cipher," 2014, Wikipedia article—http://en.wikipedia.org/w/index.php?title=Feistel_cipher&oldid=591294982 [May 27, 2014], 6 pages.

"Linear feedback shift register," 2014, Wikipedia article—http://en.wikipedia.org/w/index.php?title=Linear_feedback_shift_register&oldid=609519852 [May 27, 2014], 10 pages.

"Power analysis," 2014, Wikipedia article—http://en.wikipedia.org/w/index.php?title=Power_analysis&oldid=609430707 [May 27, 2014] 4 pages.

United Kingdom Search Report dated Mar. 24, 2016 for Application No. GB1515026.1.

Mitsuru Matsui, "New Block Encryption Algorithm MISTY", Mitsubishi Electric Corporation, Edition 2.1, 15 pages, 2016.

* cited by examiner

DOUBLE-MIX FEISTEL NETWORK FOR KEY GENERATION OR ENCRYPTION

CROSS-REFERENCE TO RELATED APPLICATION(S)

The present application is related to U.S. patent application Ser. No. 13/722,871, entitled: Secure Memory Transaction Unit, filed on Dec. 20, 2012, which is a continuation-in-part of and claims priority to U.S. patent application Ser. No. 13/341,630, entitled: Infinite Key Memory Transaction Unit, filed on Dec. 30, 2011, which in turn claims priority to U.S. Provisional Patent Application No. 61/505,039, entitled: Secure Server for Configuring and Programming Secure Microprocessors and Infinite Key Memory Transaction Unit, filed on Jul. 6, 2011. The contents of all of the aforementioned are incorporated herein by reference in their entireties.

TECHNOLOGICAL FIELD

The present disclosure relates generally to the protection of data in a computer system and, in particular, to the protection of data stored in memory in a computer system, which data is often transferred on one or more buses therein.

BACKGROUND

To provide for secure communications and protection of financial, military, medical or other data requiring a high degree of protection, computer and microprocessor-based systems now implement various security measures. These measures are generally intended to preclude an adversary's illicit access to data stored in a memory being accessed by the microprocessor, for example, because the memory and microprocessor are on the same circuit board and/or coupled by a bus.

Common types of attacks on such processors can be categorized as active or passive attacks. In passive attacks an adversary reads the contents of the memory, in the hope to discover secrets, like passwords, copyrighted material, etc. A passive attacker can also monitor the data traffic between the processor and the memory (or some peripherals) for secrets.

Active attacks attempt to modify the contents of the memory, or the data traffic between the memory and the processor. Active attacks include attempts to copy-and-paste memory blocks between different locations, or playing back earlier content of the same, or another location. Such attacks can cause harm, for example by creating an infinite loop, or otherwise impact the program. In a known data recognition attack, an adversary may attempt to learn an encryption key by watching writes of known data to the same address.

It may therefore be desirable to have a system and method that addresses these challenges, and improves upon existing practices.

BRIEF SUMMARY

A technique has been developed to address malicious attempts to copy-and-paste memory blocks between different locations. This technique involves memory address-dependent encryption and address-dependent data authentication, which can be implemented by a "tweakable" cipher, where part of the key (the tweak value) may depend on the memory location and perhaps other information (e.g., version value, configuration data). This may provide a desired diversification of the data encryption and authentication. Because this and perhaps other techniques may rely on a number of different, unrelated keys, it may be desirable to have a key generation algorithm that is fast.

In view of the foregoing, example implementations of the present disclosure include a system and method for providing security in a computer system. Example implementations provide an algorithm that may be applied to generate a key for encryption of plaintext, or for the encryption itself. The algorithm is referred to at times as the double-mix Feistel network (DMFN). The algorithm may be implemented in highly parallel fashion, and may thereby be performed fast, particularly in hardware implementations. The algorithm may produce the same mixing quality with fewer rounds than the more conventional Feistel network, and may therefore generate a key or encrypt plaintext in a manner faster than the Feistel network.

The DMFN can operate on arbitrarily large input blocks, unlike a number of other algorithms commonly used in cryptography. This may be beneficial for key generation applications in which the desired keys are large. And in a number of practical secure computing systems implementing the DMFN, only one clock cycle may be necessary to compute a key. In these computing systems, for example, used secret random key material may be stored in flip-flops, which may avoid the need for slow internal memory read operations to access it.

According to one aspect of example implementations in which the DMFN may be used for key generation, a method of providing security in a computer system includes dividing a block of data into an initial left half and initial right half, and calculating an updated left half and an updated right half for each round of a plurality of rounds. Calculating the updated left half includes applying a first function to an input left half to produce a first result, and mixing the first result with an input right half. Calculating the updated right half includes applying a second function to the input left half to produce a second result, and mixing the second result with a round key. For these calculations, the input left half and input right half are the initial left half and initial right half for a first of the plurality of rounds, and the updated left half and updated right half for an immediately preceding round for each round thereafter. The method may then include producing a block of ciphertext with a key composed of the updated left half and updated right half for a last of the plurality of rounds.

In some more particularly notational examples in which the DMFN may be used for key generation, the block of data may be divided into the initial left half ($L_0$) and initial right half ($R_0$). In these examples, the updated left half and updated right half may be calculated for each round $i=0, 1, \ldots, n$:

$$L_{i+1} = F(L_i) \oplus R_i, \text{ and}$$

$$R_{i+1} = G(L_i) \oplus k_i,$$

where $L_{i+1}$ and $R_{i+1}$ represent the updated left half and updated right half, F and G represent the first function and second function, $\oplus$ represents an arithmetic addition or bitwise exclusive-or (XOR) operation, and $k_i$ represents the round key. And the block of ciphertext may be produced with the key ($L_{n+1}, R_{n+1}$).

In some examples, the first function is a non-linear function that need not be invertible, and the second function is an invertible function.

In some examples, the method may further include producing the block of data from a respective address of a memory location in a memory, and before dividing the block of data into the initial left half and initial right half. In these examples, after producing the block of ciphertext, the method may include performing a write operation to write the block of ciphertext at the memory location having the respective address. In this regard, the memory may include a window of memory locations each of which stores a respective block of ciphertext produced with a respective key that changes from memory location to memory location.

In some further examples, the block of data may be produced further from a version value that is updated with each write operation at the memory location having the respective address. In these further examples, each memory location of the window of memory locations may store the respective block of ciphertext produced with the respective key that also depends on the version value and thereby changes with each write operation.

According to another aspect of example implementations in which the DMFN may be used as a cipher for encryption, a method of providing security in a computer system includes receiving a block of plaintext, and producing a block of ciphertext from the block of plaintext. Producing the block of ciphertext may include dividing the block of plaintext into an initial left half and initial right half, and calculating an updated left half and an updated right half for each round of a plurality of rounds, such as in a manner similar to that described above. The block of ciphertext, then, may be composed of the updated left half and updated right half for a last of the plurality of rounds.

In other aspects of example implementations, systems are included for providing security in a computer system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Furthermore, it should be understood that unless otherwise specified, the terms "data," "content," "information," and similar terms may be at times used interchangeably. Like reference numerals refer to like elements throughout.

Figure 1:
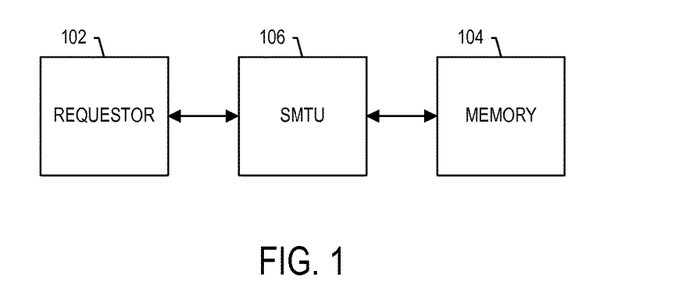
FIG. 1 is an illustration of a system in accordance with example implementations of the present disclosure.

Referring now to FIG. 1, a system 100 is illustrated according to example implementations of the present disclosure. The system may include one or more of each of a number of components, units or the like (generally "components") at least some of which may be composed of logic circuits such as multiplexers, registers, arithmetic logic units, memory, microprocessors and the like. The system may be designed for any of a number of different applications, and may have particular applicability in systems including or coupled to memory susceptible to attacks, such as in-flight computers, military and space programs, corporate network, personal and laptop computers, smart mobile devices. As shown, for example, the system may include one or more components referred to herein as requestors 102 configured to initiate or otherwise request read and/or write transactions (at times referred to as operations) with one or more memories 104, which in some examples may occur on one or more buses between them.

In accordance with example implementations, the system 100 may further include one or more components referred to herein as secure memory transaction units (SMTUs) 106 configured to encrypt and decrypt data transfers between a requestor 102 and memory 104, and may be used in at least some if not all read or write transactions with the memory. And as described below, in some but perhaps not all examples, the SMTUs may also be configured to authenticate the contents of the memory. In various examples, the SMTU design may be memory agnostic in that the type and location of the memory (internal or external) may be "unknown" to the SMTU.

The SMTU 106 may generate, with very high probability, a different encryption key for every location in the memory 104. In some examples, the SMTU may generate these encryption keys using an algorithm referred to herein at times as a double-mix Feistel network (DMFN). The SMTU may use standard encryption algorithms as ciphers, such as a combination of standard operation modes of the Advanced Encryption Standard (AES) cipher, for encryption and authentication of the contents of the memory. Or in some examples, the SMTU may use the DMFN for encryption and authentication. Each amount (e.g., 16 bytes) of plaintext data (sometimes simply referred to as plaintext or data) to be stored at a respective memory location at least within a window of memory locations may be encrypted with a unique encryption key and tagged with a version value and data authentication tag, which may be stored at the memory location with the encrypted data (at times referred to as ciphertext).

In some examples, the version value may be derived from a global write counter (GWC) (e.g., 48-bit value) that indicates the number of encrypted write operations that have taken place such as in a current computing session. In other examples, the version value may be derived using the number of write operations over multiple computing sessions, a time stamp or the like. Or in yet other examples, the version value may be derived from a clock.

In some examples, the GWC may be reset at the beginning of every session of secure operation. The GWC values may be stored in-the-clear or encrypted with the user data, and modified by a secret mask value before use as part of the key generation. The GWC value may be incremented before any write operation by an increment value, which may be sized similar to the GWC (e.g. 48-bit value). This increment value may be a large odd value that does not have many consecutive 1's or 0's in its binary representation. Examples of suitable increment values are segments of the bit sequences of $\pi$, e, $\sqrt{2}$, $\sqrt{3}$, the golden ratio, etc. Use of values such as these may assure that consecutive GWC values differ in about half the bits, in the average. Use of an odd GWC increment value may assure that the GWC will not wrap around in typical applications for more than ten years of continuous operation.

The data authentication tag at a memory location may depend on the ciphertext at that memory location, and in a manner that is cryptographically secure in that an adversary cannot create a valid data authentication tag, nor may the adversary be able to deduce any information about the ciphertext from the data authentication tag. In some examples, the data authentication tag may serve as a message authentication code, a short piece of information used to authenticate the ciphertext, and to detect data tampering and forgery. The tag may protect both the ciphertext's integrity as well as its authenticity, by allowing detection of any changes to it. In some examples, the tag may be implemented by a block cipher, that is, an algorithm that operates on the ciphertext to perform a transformation specified by a key.

The ciphertext and data authentication tag at a memory location may be produced with keys based on at least the version value and address of the memory location. The version value may be updated with each write operation at a memory location, and the key with which the ciphertext is produced may thereby change with each write operation, as well as from memory location to memory location. The data authentication tag may be produced with a second key different from the key that produced the block of ciphertext; but like that key, the second key may change with each write operation and from memory location to memory location. In some examples, a secret random number and other values, such as a security mode value, may be incorporated to further diversify the encryption and authentication. As described herein, the term random may be used broadly to refer to either random or pseudorandom.

During read transactions in which the requestor 102 has requested data from the memory, the SMTU may read previously-encrypted data (ciphertext) from the memory. The encrypted data may be decrypted and authenticated by the SMTU against signs of tampering; and the SMTU may return the decrypted data (plaintext) to the requestor in instances in which the data is considered valid. In write transactions, the SMTU may read the data at a target location, then decrypt and authenticate that data just as with a read access. Once this is complete, the SMTU may cause the data to be written to be merged with the data read from the location, encrypted, and then written back to the memory. As used here, merged means to replace the portion of the data read back that has changed. If desired, a different approach can be used when a complete block of ciphertext is to be written. In these instances, the merge operation may become a replacement, and the initial read operation may be omitted, trading security for speed.

In various examples, a method for providing security for read data being transferred between, or within, units in the system 100 may include dividing the memory 104 into a series of addressable locations (the memory thereby being an addressable memory), each having an address and each storing encrypted data, a version value (sometimes referred to as version information) and a data authentication tag. As described herein, an addressable location of the memory may at times be varyingly but equally referred to as an address, a location or an addressable location. A unique encryption key for the encrypted data, and a different, unique authentication key for the data authentication tag, may be used for each address. These keys may be unpredictable to an adversary, and kept secret before, during and after they are used.

In each read operation, the version value, data authentication tag and a block of ciphertext may be read at a memory location having a respective address. The respective keys with which the ciphertext and data authentication tag were produced may be regenerated using the version value and respective address. The ciphertext may be decrypted with its key to produce its corresponding plaintext. And using the second key for the data authentication tag, the ciphertext may be compared with the data authentication tag to verify its integrity and authenticity.

In each write operation, new plaintext data may be written to a memory location in memory 104. In some examples, each write operation may be preceded by a data read at the location and verification of the data by the SMTU 106 as valid. The process of writing data to the memory location may include the SMTU updating the version value such as to reflect a new number of memory write operations made. The SMTU may then generate another key for encryption of the new data using the updated version value and respective address of the memory location (and perhaps a random number and/or some other values), and the SMTU may generate a new second key for production of a new data authentication tag that depends on the encrypted new data.

In a further aspect of example implementations of the present disclosure, the SMTU 106 may be configured to implement a DMFN for generation of keys for encryption, or for encryption itself. For key generation, the SMTU may be configured to divide a block of data into an initial left half and initial right half, and calculate an updated left half and an updated right half for each round of a plurality of rounds. In this regard, calculation of the updated left half may include application of a first function (that may but need not be invertible) to an input left half to produce a first result, which may be mixed with an input right half. Calculation of the updated right half may include application of a second function (that may be invertible) to the input left half to produce a second result, which may be mixed with a round key. The input left half and input right half may be the initial left half and initial right half for the first of the plurality of rounds, and the updated left half for an immediately preceding round for each round thereafter. The SMTU may then produce a block of ciphertext with a key composed of the updated left half and updated right half for the last of the plurality of rounds.

In some examples, the key may be diversified based on memory locations of the memory 104 in which blocks of ciphertext may be stored. That is, the memory may include a window of memory locations each of which stores a respective block of ciphertext produced with a respective key that changes from memory location to memory location. In these examples, the SMTU 106 may be further configured to produce the block of data from a respective address of a memory location in the memory, and before the block of data is divided into the initial left half and initial right half. Then after the block of ciphertext is produced, the SMTU may be configured to perform a write operation to write the block of ciphertext at the memory location having the respective address.

In some further examples, the key may be further diversified based on each write operation to a memory location in the memory 104. In these examples, the SMTU 106 may be configured to produce the block of data further from a version value that is updated with each write operation at the memory location having the respective address, and this version value may be written at the memory location along with the block of ciphertext. Each memory location of the window of memory locations, then, may store the respective block of ciphertext produced with the respective key that also depends on the version value and thereby changes with each write operation.

For encryption, the SMTU 106 may be configured to receive a block of plaintext, and produce a block of ciphertext from the block of plaintext, such as for storage at a memory location in the memory 104. This may include the SMTU being configured to divide the block of plaintext into an initial left half and initial right half, and calculate an updated left half and an updated right half for each round of a plurality of rounds, such as in a manner similar to that described above and explained in greater detail below. The block of ciphertext, then, may be composed of the updated left half and updated right half for the last of the plurality of rounds.

Figure 2:
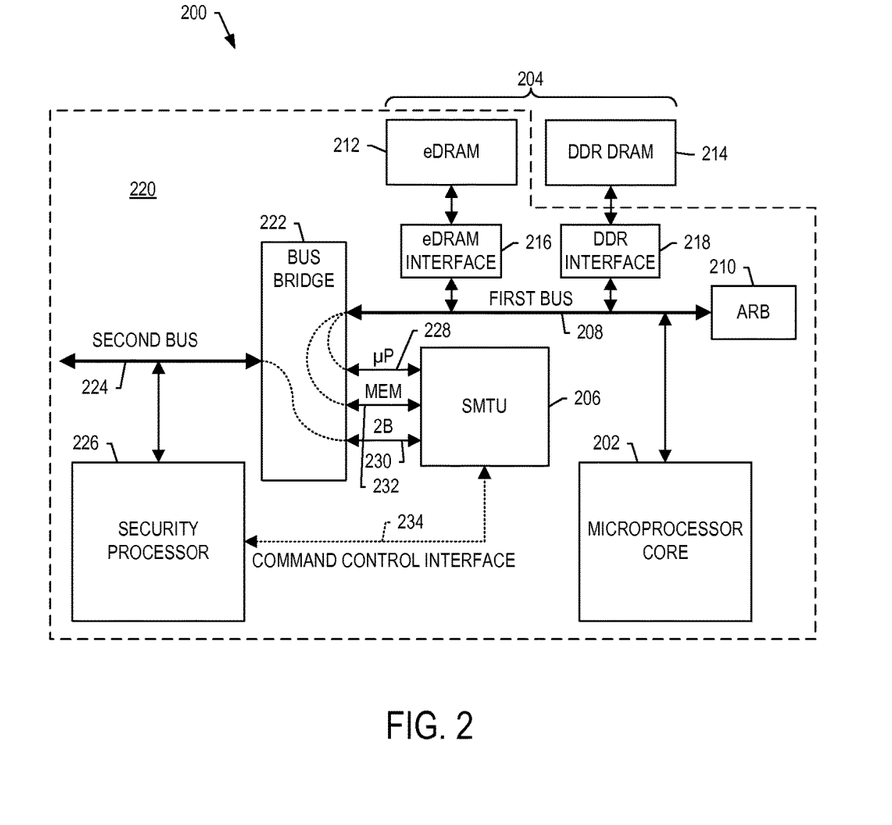
FIG. 2 is an illustration of a system that in some examples may correspond to the system of FIG. 1.

FIG. 2 illustrates one example of a system 200 that in some examples may correspond to the system 100 of FIG. 1. The system may be constructed in accordance with any of a number of different approaches. In some examples, the system may be constructed according to a system-on-chip (SoC) approach in which the components of a system are integrated into a single integrated circuit (IC) (sometimes referred to as a "chip"). In a more particular example, the system may be constructed according to the CoreConnect microprocessor bus-architecture from IBM Corporation. As described herein, various components of the system or functions of components of the system may be described in the nomenclature of a particular technology such as SoC or even CoreConnect. It should be understood that any specific nomenclature used herein is merely for purposes of illustration, and should not be taken to limit the scope of example implementations of the present disclosure.

Similar to the system 100 of FIG. 1, the system 200 of FIG. 2 may include a number of components at least some of which may be composed of logic circuits. As shown, for example, the system may include a microprocessor core 202, memory 204 and SMTU 206, which in some examples may function as or correspond to the requestor 102, memory 104 and SMTU 106 of FIG. 1. Although not shown, it should be understood that the system may include other components that may at times be configured to function as a requestor, which again may be a component configured to initiate or otherwise request read and/or write transactions with memory.

As shown in FIG. 2, the microprocessor core 202 may be directly or indirectly coupled to a first bus 208 along with the memory 204, SMTU 206 and other components, and use of the first bus may be allocated by an arbitration circuit 210. In one example, the microprocessor core may be a PowerPC core commercially available from IBM Corporation, and the first bus may be a processor local bus (PLB). Examples of suitable memory include embedded dynamic access memory (eDRAM) 212, double data rate synchronous (or other) dynamic random access memory (DDR DRAM) 214 or the like, some of which may be coupled to the first bus by respective memory controls or interfaces 216, 218. In some examples in which the system is constructed as a SoC with various components integrated into a single integrated circuit 220, the memory may be off-chip (external) from other components of the system, and may be coupled to the first bus by an on-chip (internal) memory control. This is illustrated, for example, by the DDR DRAM in FIG. 2.

The components coupled to the first bus 208 may also include a bus bridge 222 between the first bus and another, second bus 224 such as a transaction bus to which additional components may be coupled, such as a security processor 226 and perhaps components that may at times function as requestors. In some examples, the first bus may be a high-speed bus with high-performance components coupled thereto, and the second bus may be a low-speed bus. In these examples, the bus bridge may serve to separate the high-performance components from the low-performance components, which may in turn improve system performance.

The SMTU 206 may be configured to encrypt and decrypt data transfers between requestors such as the microprocessor core 202 and either or both of the eDRAM 212 or DDR DRAM 214. The SMTU may act as a slave unit serving read and write requests initiated by the microprocessor core or another requestor, where the SMTU may initiate the read or write as requested from a particular memory address. The SMTU may thereby provide a high level of security for these transactions.

The SMTU 206 may be coupled in the system 200 in any of a number of different manners. As shown, for example, the SMTU may be coupled to the bus bridge 220 by three bidirectional external data interfaces, and may be coupled to the security processor 226 by another bidirectional external data interface. That is, the SMTU may be coupled to the bus bridge by a microprocessor-core interface 228, a second-bus interface 230 and a memory interface 232, and coupled to the security processor by a command-and-control interface 234.

The microprocessor-core interface 228 may be coupled to the microprocessor core 202 via the first bus 208 to receive control information such as requests to read data from and/or write data to memory 204. The second-bus interface 230 may be coupled to the second bus 224, and the memory interface 232 may be coupled to the memory via the first bus. The bus bridge 220 may allow transactions over the microprocessor-core interface and memory interface be routed only to and from the first bus, and the transactions over the second-bus interface to be routed only to and from the second bus. The command-and-control interface 234, then, may enable the security processor 226 to provide command and control information to the SMTU through a separate interface.

Figure 3:
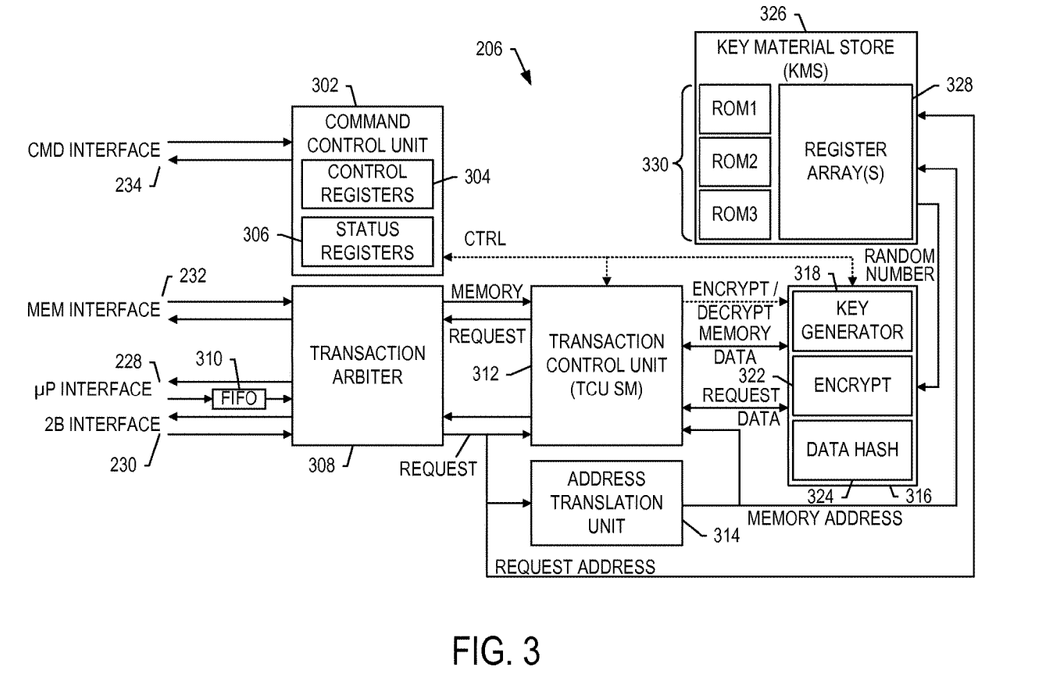
FIG. 3 is an illustration of a secure memory transaction unit, in accordance with example implementations.

FIG. 3 is a diagram illustrating various components of the SMTU 206 of FIG. 2, at least some of which, again, may be composed of logic circuits. As shown, the SMTU may include, and the command-and-control interface 234 may be coupled to, a command control unit 302 having control registers 304 and status registers 306. The SMTU may include a transaction arbiter 308 coupled to and configured to allocate use of the microprocessor-core interface 228, second-bus interface 230 and memory interface 232. A first-in first-out (FIFO) memory 310 on the microprocessor-core interface may be configured to buffer transactions to the arbiter.

The arbiter 308 may also be coupled to a transaction control unit 312 and an address translation unit 314, and the transaction control unit may be in turn coupled to a cryptography unit 316 that provides a key generator 318, encryption unit 320 and data-hashing unit 322. The cryptography unit may be coupled to a key material store (KMS) 326 configured to provide random numbers to the key generator to generate keys for the encryption unit and data-hashing unit. The encryption unit may be configured to encrypt and decrypt data for all read and write operations with an appropriate memory 204 in response to read or write requests invoking the SMTU 206. And the data-hashing unit may be configured to produce data authentication tags for encrypted data (ciphertext) read from and written to the memory. In some examples, the encryption unit may be configured to employ an AES cipher for encryption and decryption operations, and the data-hashing unit may be configured to employ a keyed hash function.

In some examples, the KMS 326 may include one or more register arrays 328 (sometimes referred to as KMS memories) configured to provide random numbers. Because the SMTU relies on random numbers provided by the KMS, the use of high quality random numbers is often desirable. In some examples, then, the KMS may include four 64×64 register arrays that provide 16K-bit random numbers. Prior to operation, the KMS unit may be initialized with 16K-bit random numbers, which in some examples may be generated outside of the SMTU.

As an alternative to using a true random number, in some examples, the KMS 326 may be initialized from one or more onboard configuration/entropy read-only memory blocks (ROMs) 330 such as 512×16 ROMs, three of which are shown as ROM1, ROM2 and ROM3. These ROMs may contain random numbers generated during system design. Using the configuration ROMs as the source of the random numbers may make the generated keys less random, therefore degrading the strength of the anti-tampering mechanism. However, there are applications in which using the ROMs as the random number sources may be desirable. One application is of a time critical application, in which long initialization delays that are associated with generation of the random number are not acceptable. Another type is an application that needs to generate an encrypted data image that can be restored following a system reset or an image that can be restored on a different system.

Further information regarding various features of the system 200 and SMTU 206 according to example implementations may be found below and in the aforementioned, related and incorporated '871 application.

Figure 4:
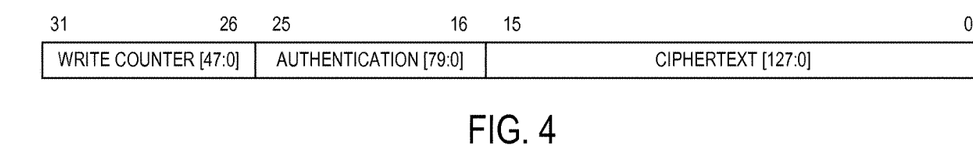
FIG. 4 illustrates the data structure of information stored in a memory location, in accordance with example implementations.

FIG. 4 illustrates the data structure for encrypted data stored in memory 104, 204, according to some example implementations of the present disclosure. As shown, encrypted data may be stored using 32-byte blocks each of which may include 16 bytes of encrypted payload (ciphertext), and 16 bytes of security data. The security data may include 6 bytes of version value (in the illustrated example, a write counter value), and 10 bytes of authentication tag. The 6-byte write counter is a field that may be incremented every time a memory location is written, regardless of the address. As a result, the incremented value is unique to each address. The encryption operation and the authentication key for a memory location may be derived from its address, and write counter value, and from a random number. In other examples, more or fewer fields may be used in the encryption. Because every 16 bytes of encrypted data require an additional 16 bytes for an authentication tag and write counter value, the effective data storage capacity of each window of memory locations may be one-half its physical size. But again, in other examples, larger or smaller memories and different data and tag sizes may be implemented.

As explained above, the SMTU 106, 206 may be configured to generate encryption keys (e.g., key generator 318) and/or perform encryption (e.g., encryption unit 320, data-hashing unit 322) using the DMFN algorithm or structure, which as described above, may include a number of benefits over a number of other algorithms commonly used in cryptography.

In some examples, the DFMN may be used to generate keys for encrypting data stored in memory 104, 204. This key generation may be based on secret random numbers (e.g., KMS 326), and may also be diversified by memory location address and perhaps other data, such as version value, configuration data or the like. In some examples, this may include setting the input of the DFMN to the diversifying information (e.g., address, version value), where is appropriate, one or more bits may be repeated and/or inverted so as to fill an input buffer of the DFMN. And in some examples, the secret random numbers may be used as round keys.

In some examples, the DFMN may be used for the encryption of data such as that stored in memory 104, 204, the DFMN in these examples being used as a cipher. Here, the input of the DFMN to may be set to a secret random number. The round keys, then, may be based on the diversifying information. In some examples, different versions of the diversifying information may be used as round keys, where the versions may be shifted versions of the diversifying information, or versions in which one or more bits have been repeated and/or inverted. In other examples, a key may be produced from the diversifying information, and the round keys may be produced based on that key and a key schedule.

Aspects of the DFMN and its relation to the more conventional Feistel network according to example implementations will now be described.

In cryptography, a Feistel network (sometimes referred to as the Feistel cipher) is a cipher performed in iterations (or rounds) with an internal function called the round function, and round keys for respective rounds. In the Feistel network, input data may be split into left and right halves from which, in the first round, updated left and right halves may be calculated. The updated left half is simply the right half. The updated right half, on the other hand, is calculated by applying the round function to the right half and round key, and mixing its result with the left half. These updated left and right halves may then be input to the second round and the process repeated to calculate updated left and right halves for the third round, and so forth until the last round from which the updated left and right halves may be output.

One drawback of the Feistel network is that in each round, the updated left half is simply the right half from the previous round. Although this may ensure invertibility (making the obfuscator a permutation, a bijective 1-1 mapping), it also increases the number of necessary rounds to produce an adequate output. The DFMN of example implementations, on the other hand, may calculate new values for both the updated left and right halves in the same round. And the DFMN may accomplish this while keeping the algorithm invertible, which may ensure that different input data leads to different outputs.

Figure 5:
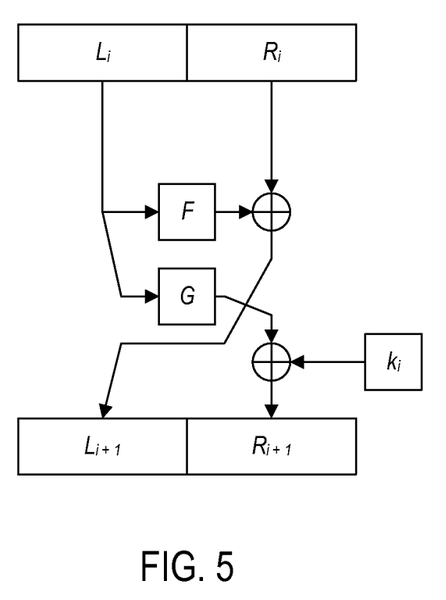
FIGS. 5 and 6 illustrate one round of a double-mix Feistel network (DMFN), in accordance with various example implementations.

FIG. 5 illustrates one round of a DMFN in accordance with example implementations of the present disclosure. As shown, a block of data for key generation, or plaintext for encryption, may be divided into the initial left half ($L_0$) and initial right half ($R_0$). The updated left half ($L_{i+1}$) and updated right half ($R_{i+1}$) may be calculated for each round i=0, 1, . . . , n:

$$L_{i+1} = F(L_i) \oplus R_i$$

$$R_{i+1} = G(L_i) \oplus k_i$$

In the preceding, F and G represent first and second functions, and $k_i$ represents the round key. Also, $\oplus$ represents a mixing operation, which in some examples may be a arithmetic (truncated) addition or bitwise logical exclusive-or (XOR) operation. The output at round n, then, may be a key ($L_{n+1}$, $R_{n+1}$) or ciphertext ($L_{n+1}$, $R_{n+1}$).

The first function (F) may be a nonlinear function. The first function may or may not be invertible, although the inverse should (but need not) be hard to compute (one-way function) in instances in which the first function is invertible. The security of the scheme may rely on the secrecy of the round key $k_i$, and on the requirements on F, that it is nonlinear and either has no inverse or has one that is hard to compute. The first function may in some examples depend on the round (e.g., $F_i$), although in other examples, the first function may be independent of the round.

The second function (G) should be invertible, but the inverse need not be easily computable. In instances in which the obfuscator is used as a cipher, deciphering may need the inverse of G (denoted as $G^{-1}$). Similar to the first function, the second function may in some examples depend on the round (e.g., $G_i$), although in other examples, the second function may be independent of the round.

The DMFN construction is invertible, because the left half ($L_i$) may be calculated from the updated right half ($R_{i+1}$), and knowing the round key $k_i$ and $G^{-1}$. The first function (F) may be applied to the left half ($L_i$), and its result mixed with the updated left half ($L_{i+1}$) to yield the right half ($R_i$). This way, the original block of data or plaintext ($L_0$, $R_0$) may be reproduced from the final output ($L_{n+1}$, $R_{n+1}$).

Various aspects of the first function (F) and second function (G) according to example implementations of the present disclosure will now be described, beginning with the second function.

In some examples, a layer of substitution boxes (s-boxes) may be used for the second function (G), which may make its mapping nonlinear. In other examples, the second function may perform a circular shift or rotation of the left half, which may then be mixed with the round key to calculate the updated right half. In a more particular example, the second function may produce a circular-shifted version of the left half, each three bits of which may be XOR-ed with a bit of the round key to produce a bit of the resulting, updated right half. In this regard, it may be shown that at block lengths=$2^n$, XORing any three circular shifted versions of the data defines an invertible function. Moreover, in hardware implementations, these shifts or rotations may not consume time as they may be simply implemented with appropriate wirings. Thus, the second function and mixing operations may only require the time of two XOR gate delays, which with optimized cell libraries, may be the time equivalent of 1.5 to 3 NAND2 gate delays.

In instances in which the DFMN is used as a cipher for encryption, the inverse of the second function ($G^{-1}$) may be required for a decipher operation, although certain encryption modes such as counter mode and various feedback modes do not need the inverse of DMFN for a decipher operation, with decryption also being accomplished with the forward direction of the cipher. Further to the above example in which the second function may include rotate-XOR operations, it may be shown that its inverse can also be computed with rotate-XOR operations, although many terms may be needed.

When fast deciphering is desired, the shift or rotation distances may be particularly selected such that only a manageable number of rotation-XOR operations are used for adequate mixing. An example of a suitable set of rotations is s1=$S^3$ and s2=$S^{67}$ (left circular shift of a 128-bit $L_i$ (or $R_{i+1} \oplus k_i$ at decryption) by 3 and by 67). In this case $G^{-1}$=G. There are a number of analogous self-inverse G functions, such as those with rotations defined by (1, 65), (2, 66), (3, 67), (4, 68), etc. It may be stated in general that for a block length of $2^n$ bits, the inverse of the function $G(x)=x \oplus rot(k, x) \oplus rot(2^{n-1}+k,x)$ is itself.

Also in instances in which the DFMN is used as a cipher, during deciphering, the first function (F) and inverse of the second function ($G^{-1}$) generally cannot be applied in parallel since the input of the first function may be needed before the first function can be applied to calculate the right half from the updated left half. Deciphering may therefore require almost twice as much time as enciphering, although their performance may still be fast since fewer rounds may be required than as by the original Feistel cipher.

In instances in which a linear function is chosen for the second function (G), a nonlinear function may be chosen for the first function (F). One example of a suitable first function includes a plurality of logical NAND operations each of which is for a respective pair of shifted versions of the input left half, and a logical XOR for the respective outputs of the NAND operations. In the context of three NAND operations, the first function may include the following:

a first NAND operation for a first pair of shifted versions of $L_i$;

a second NAND operation for a second pair of shifted versions of $L_i$;

a third NAND operation for a third pair of shifted versions of $L_i$; and a XOR operation for the respective outputs of the first, second and third NAND operations.

Similar to the second function, in hardware implementations, these shifts or rotations may not consume time as they may be simply implemented with wirings. Thus, the first function may only require the time of two XOR gate delays, plus the delays of the two input NAND gates (although AND or NOR gates work equally well), which with optimized cell libraries, may be the time equivalent of four NAND2 gate delays.

Figure 6:
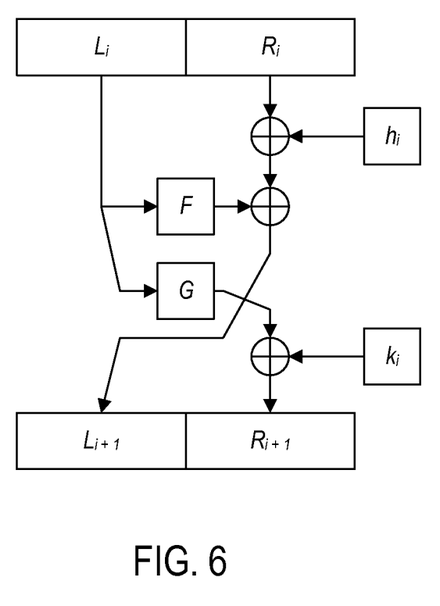

Reference is now made to FIG. 6, which illustrates one round of a DMFN in accordance with these other example implementations. In the DMFN, by applying the round key $k_i$ to alter $R_{i+1}$ instead of $L_{i+1}$, the work calculating the two halves may be balanced. That is, the two halves may become available in the same time. But $R_i$ may be unused while the first function (F) is applied. Thus, as shown in FIG. 6, $R_i$ may be mixed with another round key $h_i$ without upsetting the balance. And both $R_{i+1}$ and $L_{i+1}$ may be influenced by key material.

The DMFN shown in FIG. 6 may achieve better overall mixing properties when functions of similar complexity are chosen for the first function (F) and second function (G). In yet other examples such as in instances in which the second function is slower to calculate than the first function, the mixing in of $k_i$ may be omitted, which may result in a scheme similar to the DMFN shown in FIG. 5 in mixing properties, but slightly faster.

Returning to FIGS. 2 and 3, at write operation at a memory location in the window of memory locations in the memory 204 according to example implementations may include the microprocessor core 202 generating a request for data at a memory location having a respective address, and providing that address to the memory 204 on the first bus 208. Of course, rather than receiving the address from the microprocessor core, the address may be provided from some other requestor such as a direct memory access controller.

The received address may also be provided to the SMTU 206. In some examples, the address may be a logical address, and may be translated by the address translation unit 314 to a physical address. The address may be provided through the transaction control unit 312 to the key generator 318, which may functionally include three key generators, at times referred to herein as key generators W, C and D configured to generate respective keys W, C and D, one or more of which in some examples may be generated using a DMFN. Each of the three key generators may also receive the random numbers earlier stored or generated in the KMS 326. Stored at the memory location is the write counter value (e.g., version value), data authentication tag and block of ciphertext, and this information may be provided to the transaction control unit. In some examples, the write counter value may be encrypted, and this encryption can be very simple, and its key can be a predefined constant, without significant loss of security.

The encryption unit 320 or another component of the SMTU 206 may decrypt the write counter value using key W. The encryption unit 320 may decrypt the ciphertext using key C, while the transaction control unit may employ the data-hashing unit 322 to verify the integrity of the ciphertext based on the ciphertext, key D and data authentication tag, and in some examples, either may use a DMFN. Assuming that the integrity of the ciphertext is verified, the decrypted ciphertext (now plaintext) may be rewritten to the memory location. On the other hand, instances in which the ciphertext authenticity is not verified may signal an error.

In instances in which an error occurs, it may indicate that a random error or possible data tampering has occurred, and the transaction control unit 312 may perform any of a number of different actions in response. For example, the transaction control unit may cause the system 200 to (i) stop processing all read and write requests, (ii) delete the random number used for encryption in the current session, (iii) flush all registers that participated in key generation activities, (iv) trigger a memory flush to overwrite the content of the memory window with all zeros, or (v) take other action. In another example, the transaction control unit may maintain a fault counter, which may be incremented in response to an error. In this approach, if a threshold of the number of errors is reached, the transaction control unit may cause any one or more of the aforementioned actions. This approach may be useful in a noisy environment where random memory read errors occasionally occur.

In some examples, a write operation at a memory location in the memory 204 may be preceded by a read operation at the memory location, such as that described above, to verify that the data stored at the memory address is authentic. If prior read is performed, only if the read operation establishes the authenticity of the data, does a write operation occur. In some examples, then, the write operation may include the transaction control unit 312 being configured to merge new data to be written with the decrypted ciphertext (plaintext).

The transaction control unit 312 being configured to increment a GWC, and provide the updated value to each of key generators C and D of key generator 318. Using the incremented write counter value and the address of the memory location, key generators C and D may generate new keys C and D (e.g., using a DMFN), and provide the keys to the encryption unit 320 and data-hashing unit 322, respectively. The encryption unit may use new key C to encrypt the merged plaintext to produce new ciphertext, and the data-hashing unit may use the reproduced ciphertext and key D to produce a new data authentication tag, either or both of which may in some examples use a DMFN. The combination of key W and the incremented GWC value may be used to provide an encrypted write counter value. The resulting write counter value, data authentication tag and ciphertext may then be returned and written to the memory location.

Figure 7:
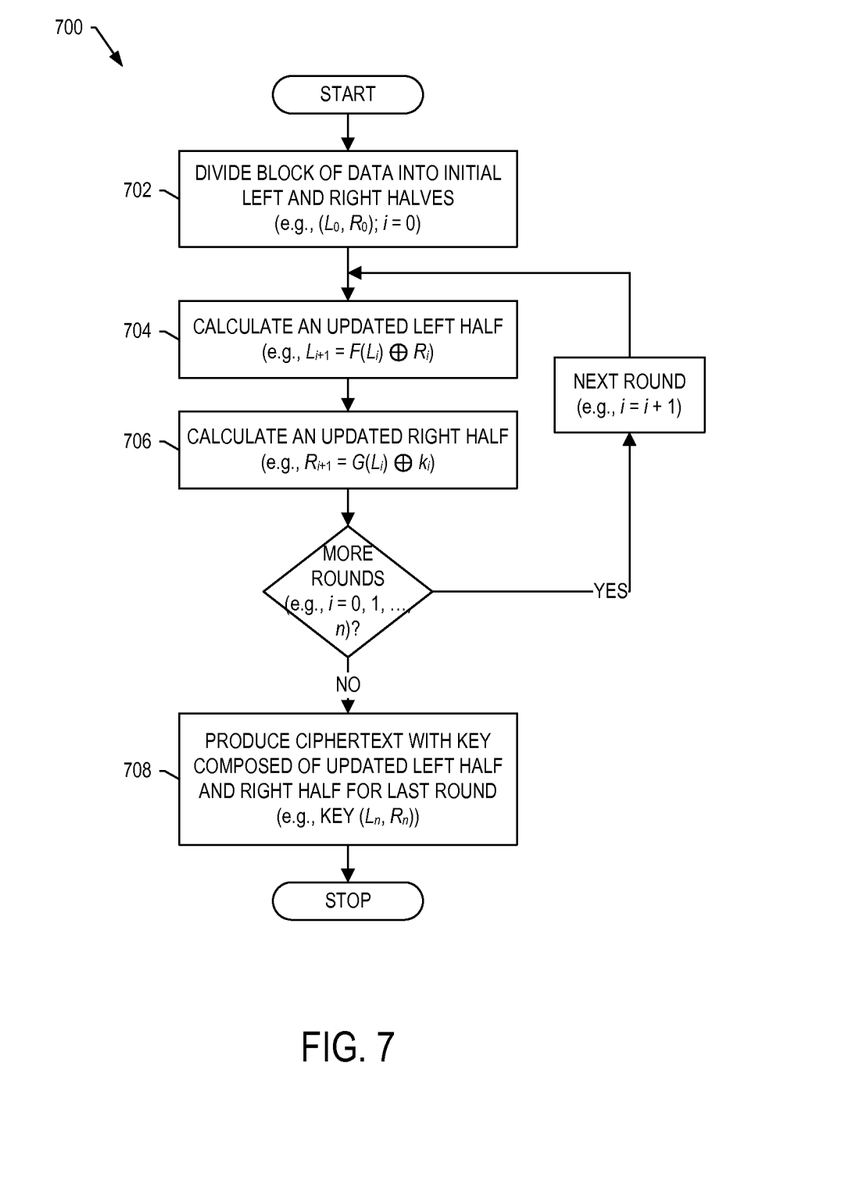
FIGS. 7 and 8 illustrate flowcharts including various operations in respective methods according to example implementations.

FIG. 7 illustrates various operations in a method 700 of providing security in a computer system, according to example implementations of the present disclosure. As shown at block 702, the method may include dividing a block of data into an initial left half and initial right half. The method may then include calculating an updated left half and an updated right half for each round of a plurality of rounds. As shown in block 704, calculating the updated left half includes applying a first function to an input left half to produce a first result, and mixing the first result with an input right half. And as shown in block 706, calculating the updated right half includes applying a second function to the input left half to produce a second result, and mixing the second result with a round key. For these calculations, the input left half and input right half are the initial left half and initial right half for a first of the plurality of rounds, and the updated left half and updated right half for an immediately preceding round for each round thereafter. The method may then include producing a block of ciphertext with a key composed of the updated left half and updated right half for a last of the plurality of rounds, as shown in block 708.

Figure 8:
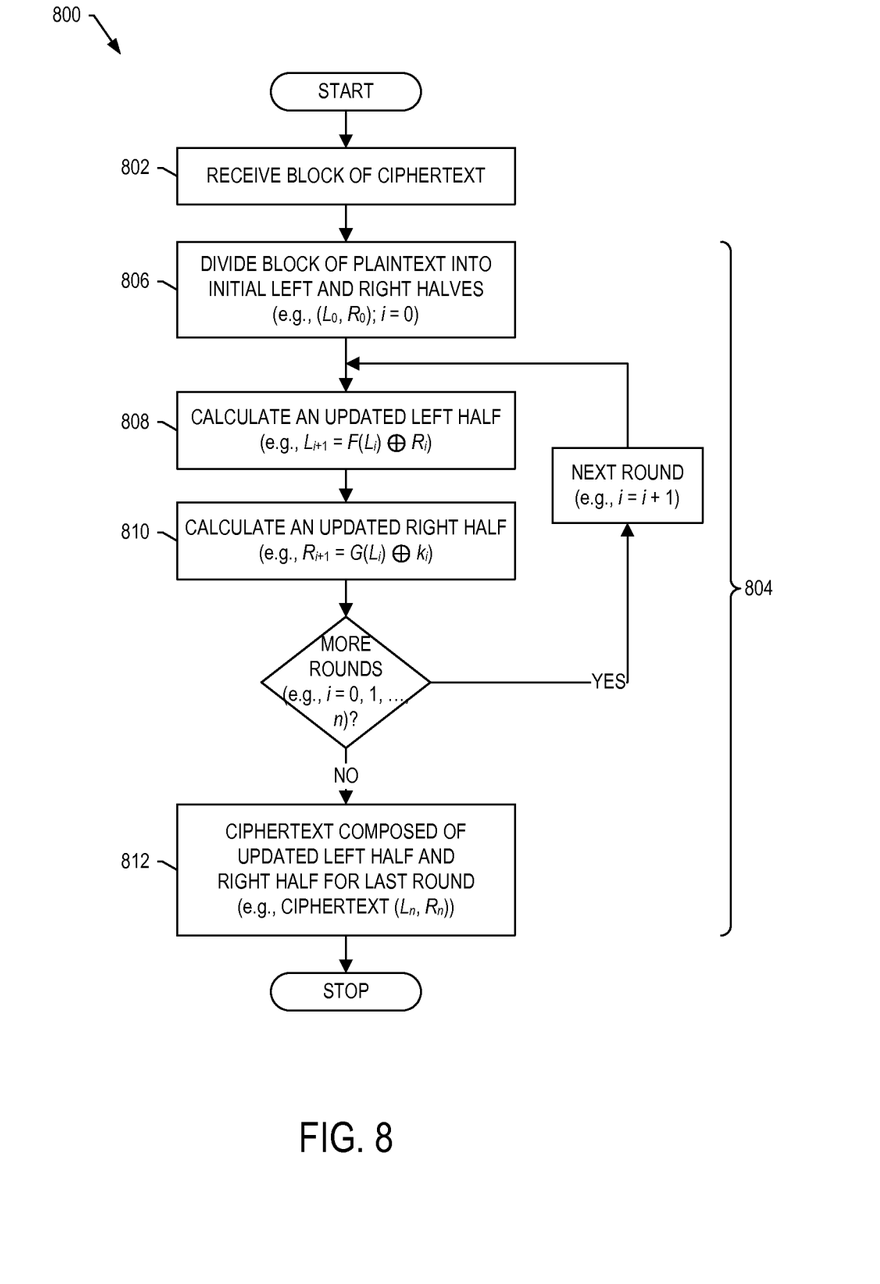

FIG. 8 illustrates various operations in a method 800 of providing security in a computer system, according to other example implementations of the present disclosure. As shown at block 702, the method may include receiving a block of plaintext, and at 804, producing a block of ciphertext from the block of plaintext. Producing the block of ciphertext may include dividing the block of plaintext into an initial left half and initial right half, as shown at block 806. And producing the block of ciphertext may include calculating an updated left half and an updated right half for each round of a plurality of rounds, such as in a manner similar to that described above with respect to FIG. 7, as shown at blocks 808 and 810. The block of ciphertext, then, may be composed of the updated left half and updated right half for a last of the plurality of rounds, as shown at block 812.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for providing security in a computer system, the system comprising one or more logic circuits configured to at least:
   produce a block of data from a respective address of a memory location in a memory; divide the block of data into an initial left half and initial right half;
   calculate an updated left half and an updated right half for each round of a plurality of rounds,
      wherein the one or more logic circuits being configured to calculate the updated left half includes being configured to apply a first function to an input left half to produce a first result, and mix the first result with an input right half,
      wherein the one or more logic circuits being configured to calculate the updated right half includes being configured to apply a second function to the input left half to produce a second result, and mix the second result with a round key, the input left half to which the first function is applied being identical to the input left half to which the second function is applied, and
      wherein the input left half and input right half are the initial left half and initial right half for a first of the plurality of rounds, and the updated left half and updated right half for an immediately preceding round for each round thereafter;
   produce a block of ciphertext with a key composed of the updated left half and updated right half for a last of the plurality of rounds; and
   perform a write operation to write the block of ciphertext at the memory location having the respective address.

2. The system of claim 1, wherein the first function is a non-linear function, and the second function is an invertible function.

3. The system of claim 1,
   wherein the memory includes a window of memory locations each of which stores a respective block of ciphertext produced with a respective key that changes from memory location to memory location.

4. The system of claim 3, wherein the one or more logic circuits being configured to produce the block of data includes being configured to produce the block of data further from a version value that is updated with each write operation at the memory location having the respective address, and
   wherein each memory location of the window of memory locations stores the respective block of ciphertext produced with the respective key that also depends on the version value and thereby changes with each write operation.

5. The system of claim 1, wherein the one or more logic circuits being configured to divide the block of data includes being configured to divide the block of data into the initial left half ($L_0$) and initial right half ($R_0$),
   wherein the one or more logic circuits being configured to calculate the updated left half and updated right half includes being configured to calculate for each round i=0, 1, . . . , n:

$L_{i+1}=F(L_i) \oplus R_i$, and $R_{i+1}=G(L_i) \oplus k_i$, wherein $L_{i+1}$ and $R_{i+1}$ represent the updated left half and updated right half, F and G represent the first function and second function, $\oplus$ represents an arithmetic addition or bitwise exclusive-or (XOR) operation, and $k_i$ represents the round key, and
   wherein the one or more logic circuits being configured to produce the block of ciphertext includes being configured to produce the block of ciphertext with the key ($L_{n+1}$, $R_{n+1}$).

6. A system for providing security in a computer system, the system comprising one or more logic circuits configured to at least:
   receive a block of plaintext;
   produce a block of ciphertext from the block of plaintext, wherein the one or more logic circuits being configured to produce the block of ciphertext includes being configured to at least:
      divide the block of plaintext into an initial left half and initial right half; and
      calculate an updated left half and an updated right half for each round of a plurality of rounds,
         wherein the one or more logic circuits being configured to calculate the updated left half includes being configured to apply a first function to an input left half to produce a first result, and mix the first result with an input right half,
         wherein the one or more logic circuits being configured to calculate the updated right half includes being configured to apply a second function to the input left half to produce a second result, and mix the second result with a round key, the input left half to which the first function is applied being identical to the input left half to which the second function is applied, and
         wherein the input left half and input right half are the initial left half and initial right half for a first of the plurality of rounds, and the updated left half and updated right half for an immediately preceding round for each round thereafter, and
   wherein the one or more logic circuits being configured to produce the block of ciphertext includes being configured to produce the block of ciphertext composed of the updated left half and updated right half for a last of the plurality of rounds; and
   perform a write operation to write the block of ciphertext at a memory location having a respective address.

7. The system of claim 6, wherein the first function is a non-linear function, and the second function is an invertible function.

8. The system of claim 6, wherein the one or more logic circuits are further configured to at least:
   produce the round key for each round of the plurality of rounds based on the respective address of a memory location in a memory,
   wherein the one or more logic circuits being configured to perform the write operation includes being configured to perform the write operation to write the block of ciphertext at the memory location having the respective address, and wherein the memory includes a window of memory locations each of which stores a respective block of ciphertext produced with a respective key that changes from memory location to memory location.

9. The system of claim 8, wherein the one or more logic circuits being configured to produce the key includes being configured to produce the key further from a version value that is updated with each write operation at the memory location having the respective address, and
wherein each memory location of the window of memory locations stores the respective block of ciphertext produced with the respective key that also depends on the version value and thereby changes with each write operation.

10. The system of claim 6, wherein the one or more logic circuits being configured to divide the block of plaintext includes being configured to divide the block of plaintext into the initial left half ($L_0$) and initial right half ($R_0$),
wherein the one or more logic circuits being configured to calculate the updated left half and updated right half includes being configured to calculate for each round i=0, 1, . . . , n:

$$L_{i+1}=F(L_i) \oplus R_i, \text{ and}$$

$$R_{i+1}=G(L_i) \oplus k_i,$$

wherein $L_{i+1}$ and $R_{i+1}$ represent the updated left half and updated right half, F and G represent the first function and second function, $\oplus$ represents an arithmetic addition or bitwise exclusive-or (XOR) operation, and $k_i$ represents the round key, and
wherein the one or more logic circuits being configured to produce the block of ciphertext includes being configured to produce the block of ciphertext ($L_{n+1}$, $R_{n+1}$).

11. A method of providing security in a computer system, the method comprising:
producing a block of data from a respective address of a memory location in a memory; dividing the block of data into an initial left half and initial right half;
calculating an updated left half and an updated right half for each round of a plurality of rounds,
wherein calculating the updated left half includes applying a first function to an input left half to produce a first result, and mixing the first result with an input right half,
wherein calculating the updated right half includes applying a second function to the input left half to produce a second result, and mixing the second result with a round key, the input left half to which the first function is applied being identical to the input left half to which the second function is applied, and
wherein the input left half and input right half are the initial left half and initial right half for a first of the plurality of rounds, and the updated left half and updated right half for an immediately preceding round for each round thereafter;
producing a block of ciphertext with a key composed of the updated left half and updated right half for a last of the plurality of rounds; and
performing a write operation to write the block of ciphertext at the memory location having the respective address.

12. The method of claim 11, wherein the first function is a non-linear function, and the second function is an invertible function.

13. The method of claim 11,
wherein the memory includes a window of memory locations each of which stores a respective block of ciphertext produced with a respective key that changes from memory location to memory location.

14. The method of claim 13, wherein producing the block of data includes producing the block of data further from a version value that is updated with each write operation at the memory location having the respective address, and
wherein each memory location of the window of memory locations stores the respective block of ciphertext produced with the respective key that also depends on the version value and thereby changes with each write operation.

15. The method of claim 11, wherein dividing the block of data includes dividing the block of data into the initial left half ($L_0$) and initial right half ($R_0$),
wherein calculating the updated left half and updated right half includes calculating for each round i=0, 1, . . . , n:

$$L_{i+1}=F(L_i) \oplus R_i, \text{ and}$$

$$R_{i+1}=G(L_i) \oplus k_i,$$

wherein $L_{i+1}$ and $R_{i+1}$ represent the updated left half and updated right half, F and G represent the first function and second function, $\oplus$ represents an arithmetic addition or bitwise exclusive-or (XOR) operation, and $k_i$ represents the round key, and
wherein producing the block of ciphertext includes producing the block of ciphertext with the key ($L_{n+1}$, $R_{n+1}$).

16. A method of providing security in a computer system, the method comprising:
receiving a block of plaintext;
producing a block of ciphertext from the block of plaintext, wherein producing the block of ciphertext includes:
dividing the block of plaintext into an initial left half and initial right half; and
calculating an updated left half and an updated right half for each round of a plurality of rounds,
wherein calculating the updated left half includes applying a first function to an input left half to produce a first result, and mixing the first result with an input right half,
wherein calculating the updated right half includes applying a second function to the input left half to produce a second result, and mixing the second result with a round key, the input left half to which the first function is applied being identical to the input left half to which the second function is applied, and
wherein the input left half and input right half are the initial left half and initial right half for a first of the plurality of rounds, and the updated left half and updated right half for an immediately preceding round for each round thereafter, and
wherein producing the block of ciphertext includes producing the block of ciphertext composed of the updated left half and updated right half for a last of the plurality of rounds; and
performing a write operation to write the block of ciphertext at a memory location having a respective address.

17. The method of claim 16, wherein the first function is a non-linear function, and the second function is an invertible function.

18. The method of claim 16 further comprising:

producing the round key for each round of the plurality of rounds based on the respective address of a memory location in a memory, wherein performing the write operation includes performing the write operation to write the block of ciphertext at the memory location having the respective address, and wherein the memory includes a window of memory locations each of which stores a respective block of ciphertext produced with a respective key that changes from memory location to memory location.

19. The method of claim 18, wherein producing the key includes producing the key further from a version value that is updated with each write operation at the memory location having the respective address, and wherein each memory location of the window of memory locations stores the respective block of ciphertext produced with the respective key that also depends on the version value and thereby changes with each write operation.

20. The method of claim 16, wherein dividing the block of plaintext includes dividing the block of plaintext into the initial left half ($L_0$) and initial right half ($R_0$), wherein calculating the updated left half and updated right half includes calculating for each round i=0, 1, . . . , n:

$$L_{i+1}=F(L_i)\oplus R_i, \text{ and}$$

$$R_{i+1}=G(L_i)\oplus k_i,$$

wherein $L_{i+1}$ and $R_{i+1}$ represent the updated left half and updated right half, F and G represent the first function and second function, $\oplus$ represents an arithmetic addition or bitwise exclusive-or (XOR) operation, and $k_i$ represents the round key, and wherein producing the block of ciphertext includes producing the block of ciphertext ($L_{n+1}$, $R_{n+1}$).

* * * * *